United States Patent
Chua

(10) Patent No.: US 8,285,876 B2
(45) Date of Patent: Oct. 9, 2012

(54) J2EE APPLICATION VERSIONING STRATEGY

(75) Inventor: Sook C. Chua, South Lake, TX (US)

(73) Assignee: International Business Machines Corporation, Armonk, NY (US)

( * ) Notice: Subject to any disclaimer, the term of this patent is extended or adjusted under 35 U.S.C. 154(b) by 1079 days.

(21) Appl. No.: 10/804,644

(22) Filed: Mar. 19, 2004

(65) Prior Publication Data

US 2005/0210124 A1 Sep. 22, 2005

Related U.S. Application Data

(60) Provisional application No. 60/554,760, filed on Mar. 19, 2004.

(51) Int. Cl.
G06F 15/16 (2006.01)
G06F 15/177 (2006.01)
G06F 9/445 (2006.01)

(52) U.S. Cl. ........................................ 709/246; 709/220

(58) Field of Classification Search ...... 707/1; 709/203, 709/219; 717/172
See application file for complete search history.

(56) References Cited

U.S. PATENT DOCUMENTS

| 5,603,027 | A | * | 2/1997 | Ohkami | 717/170 |
| 6,643,652 | B2 | * | 11/2003 | Helgeson et al. | 1/1 |
| 6,658,659 | B2 | * | 12/2003 | Hiller et al. | 717/170 |
| 6,842,903 | B1 | * | 1/2005 | Weschler | 719/328 |
| 2002/0184165 | A1 | * | 12/2002 | Deboer et al. | 706/1 |
| 2003/0105837 | A1 | * | 6/2003 | Kamen et al. | 709/220 |
| 2004/0168153 | A1 | * | 8/2004 | Marvin | 717/120 |
| 2004/0168169 | A1 | * | 8/2004 | Ebro et al. | 717/172 |
| 2004/0250248 | A1 | * | 12/2004 | Halpern et al. | 718/100 |
| 2005/0050548 | A1 | * | 3/2005 | Sheinis et al. | 719/311 |
| 2005/0209984 | A1 | * | 9/2005 | Brown et al. | 707/1 |

* cited by examiner

*Primary Examiner* — Peling Shaw
*Assistant Examiner* — Joiya M Cloud
(74) *Attorney, Agent, or Firm* — Saul Ewing LLP; John R. Pivnichny

(57) ABSTRACT

The present invention is a method, system, and computer program product enabling multiple versions/releases of a J2EE application to be served to clients from a single application server. One or more JNDI proxies are situated between each client and the application server. The JNDI proxies allow a same public "service name" to be utilized by different clients to access different programs/services on the application server. The JNDI proxies do this by translating the service name into a non-public "alias name" on behalf of the client. The alias name is a private name that the service provider who administers the application server understands and uses to locate the specific version of programs/services that the clients need.

18 Claims, 9 Drawing Sheets

J2EE APPLICATION VERSIONING STRATEGY

CROSS-REFERENCE TO RELATED APPLICATIONS

This application is based on and claims priority to U.S. Provisional Application No. 60/554,760, filed Mar. 19, 2004, which contents are incorporated fully herein by reference.

FIELD OF THE INVENTION

This invention relates to the field of computer systems and, more particularly to the field of application version management in a J2EE environment.

BACKGROUND OF THE INVENTION

A J2EE application is a multi-tiered, distributed application that commonly comprises a web-tier that interacts with a business-tier and an enterprise information systems (EIS) tier. It is also possible for a J2EE application to consist only of a business tier and an EIS tier components; there is no web component. These non-web J2EE applications are referred to as being "system-oriented," where their clients are also applications systems or computers and not end-users or human beings. In order for intersystem communications to take place, application stubs, the software that resides on the client's end, must be distributed to the client systems.

As any software user knows, as time progresses, enhancements and bug fixes are added to applications. These changes may result in a new application version or release (the terms "version" and "release" are used interchangeably herein to refer to a particular embodiment of a program/application/service). With a web-based J2EE application, clients can be redirected to the new application version in an easy, seamless fashion with minimal system downtime through the use of hardware load balancers and additional hardware (e.g., additional machines or computers). For a system-oriented J2EE application, however, migrating clients to the new application version is much more complicated, as new versions of the application stubs must be generated and distributed to client systems themselves. The changes take effect only when the clients switch to using the new application stub. This switching action must be performed in a synchronous fashion between the client and the server applications; otherwise, it may result in incompatibility errors in the binary code of the software. This complexity is further compounded if the server application is a service provider that provides an array of services co-shared by multiple clients.

As an example, consider clients X and Y sharing a service, "Service A" on a machine M1. Client X requests updates for Service A when they are issued. Deploying the new version of Service A (Service A, version 2) for Client X on M1 requires Client Y to also upgrade to avoid binary incompatibility errors. This, in itself, may cause a problem, since Client Y may not wish to upgrade to the new version.

Further, if the updated version of Service A (Service A, version 2) does not work well and Client X decides to fall back to the old version, Client Y must also execute the fall-back procedure or risk having additional binary incompatibility errors. This "synchronous application upgrade" requires tight coupling between clients and in this case, causes unwarranted service discontinuity for Client Y.

To avoid tight coupling among clients, the service provider may deploy the new application version (Service A, version 2) on a second machine M2, and have Client X point to M2, thus allowing Client Y to continue to use the old version on machine M1. This strategy, however, incurs additional hardware costs and efforts to configure the new environment. The complexity, cost and risk increases with additional clients and increased frequency of application upgrades.

As a result of the above difficulties, application service providers do not attempt to provide multiple versions or releases of the same application to clients from the same machine. Accordingly, it would be desirable to have a method, system, and computer program product for server application management in which multiple, concurrent application versions can be managed with minimal cost, effort and risk, and allow the server application to perform an application upgrade for each client in an isolated, precise fashion without the need for multiple machines or service disruption to other clients.

SUMMARY OF THE INVENTION

The present invention is a method, system, and computer program product for management and serving of multiple versions/releases of the same program from a single application server. The present invention utilizes one or more JNDI proxies situated between each client and an application server. In additional embodiments, JNDI proxies may also be situated on the application server between related applications. In accordance with the present invention, the JNDI proxies allow a same public "service name" to be utilized by different clients to access to different programs/services on the application server. The JNDI proxies do this by translating the service name into a non-public "alias name" on behalf of the client. The alias name is a private name that the service provider who administers the application server understands and uses to locate the specific version of programs/services that the clients need. Clients refer to programs/services by their service names and the JNDI proxies translate the service names to their corresponding alias names so that the service provider can use the alias names to locate the correct version of program/services for the clients on the application server. The JNDI proxies perform the name translation automatically on behalf of the client. Hence, the clients are not "version aware".

Configuration information for each client, which identifies the alias name to be used to serve specific versions of applications/services to the clients, is provided to the proxies so that a proper link can be made between the public service name and the non-public alias name for each client. Thus, the client always accesses the desired version of an application or a service in a transparent manner with respect to the client.

DETAILED DESCRIPTION OF THE INVENTION

To understand the present invention, it helps to have an understanding of the Java Naming and Directory Interface (JNDI); JNDI is a naming service that allows a program or container to register a name for an object (service). This name is commonly referred to as the JNDI name. The JNDI naming service provides a list of services identified by JNDI names, organized in a "tree" structure, that are hosted on an J2EE application server. Clients then obtain a service by connecting to the application server and looking up the bound JNDI name of the service. The JNDI names are alias names in the context of the present invention.

Figure 1:
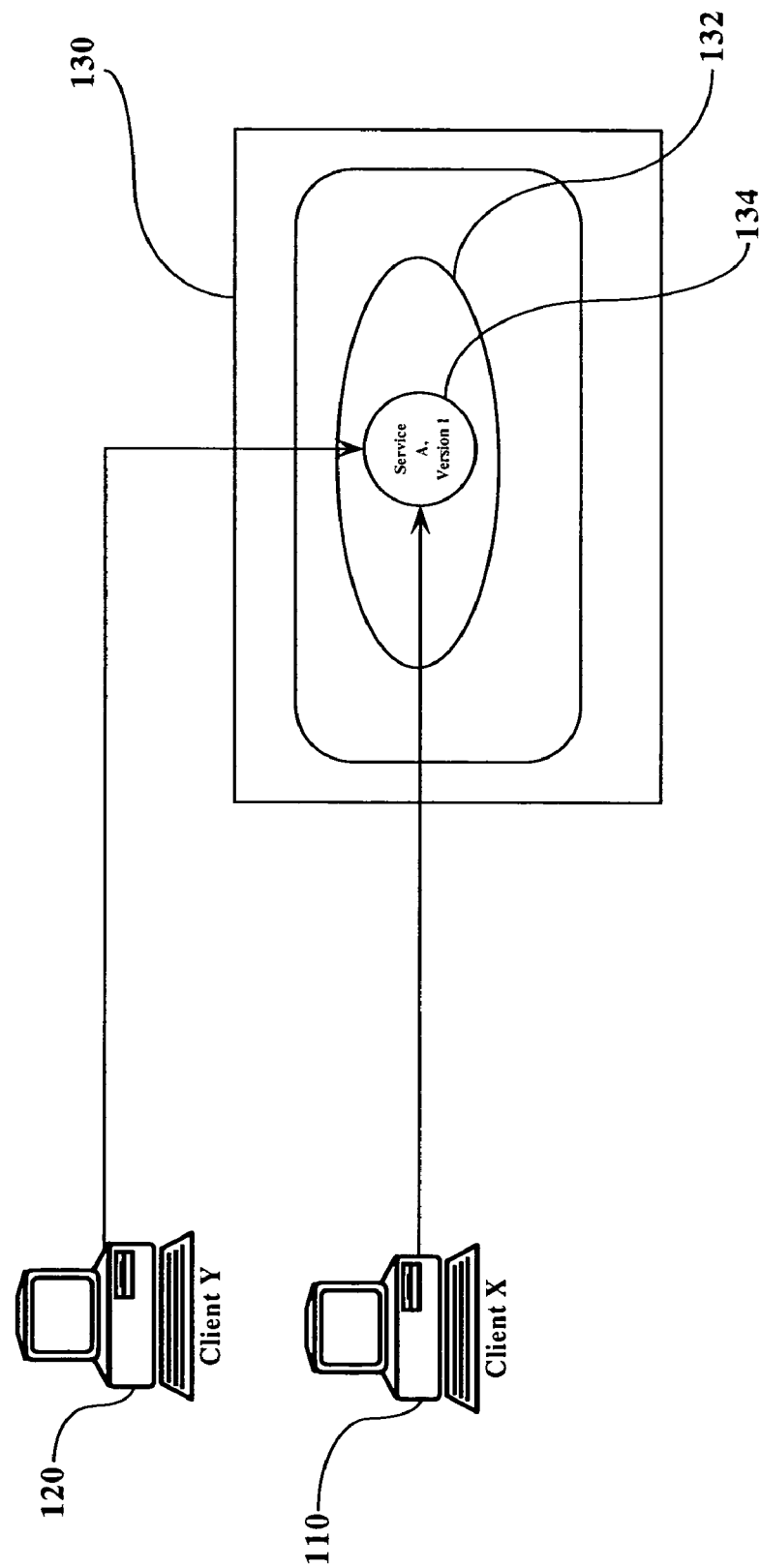
FIG. 1 is a block diagram illustrating the architecture and operation of a typical JNDI naming service being used to provide access to Enterprise Java Beans (EJBs)

FIG. 1 is a block diagram illustrating the architecture and operation of a typical JNDI naming service being used to provide access to, in this example, Enterprise Java Beans (EJBs). Referring to FIG. 1, a first client 110 (client X) and a second client 120 (client Y) access an application server 130. An EJB 134 is shown. This EJB has a JNDI (alias) name of "Service A". Since there is only a single application with a single name, client 110 and client 120 each can request Service A using the same service name, e.g., a service name such as "Lotus Notes" or a service name that is the same as the alias name used by the application server, that is, Service A. Since both clients 110 and 120 are accessing the same program, there is no concern about which application will be served to the clients; there is only one choice.

Figure 2:
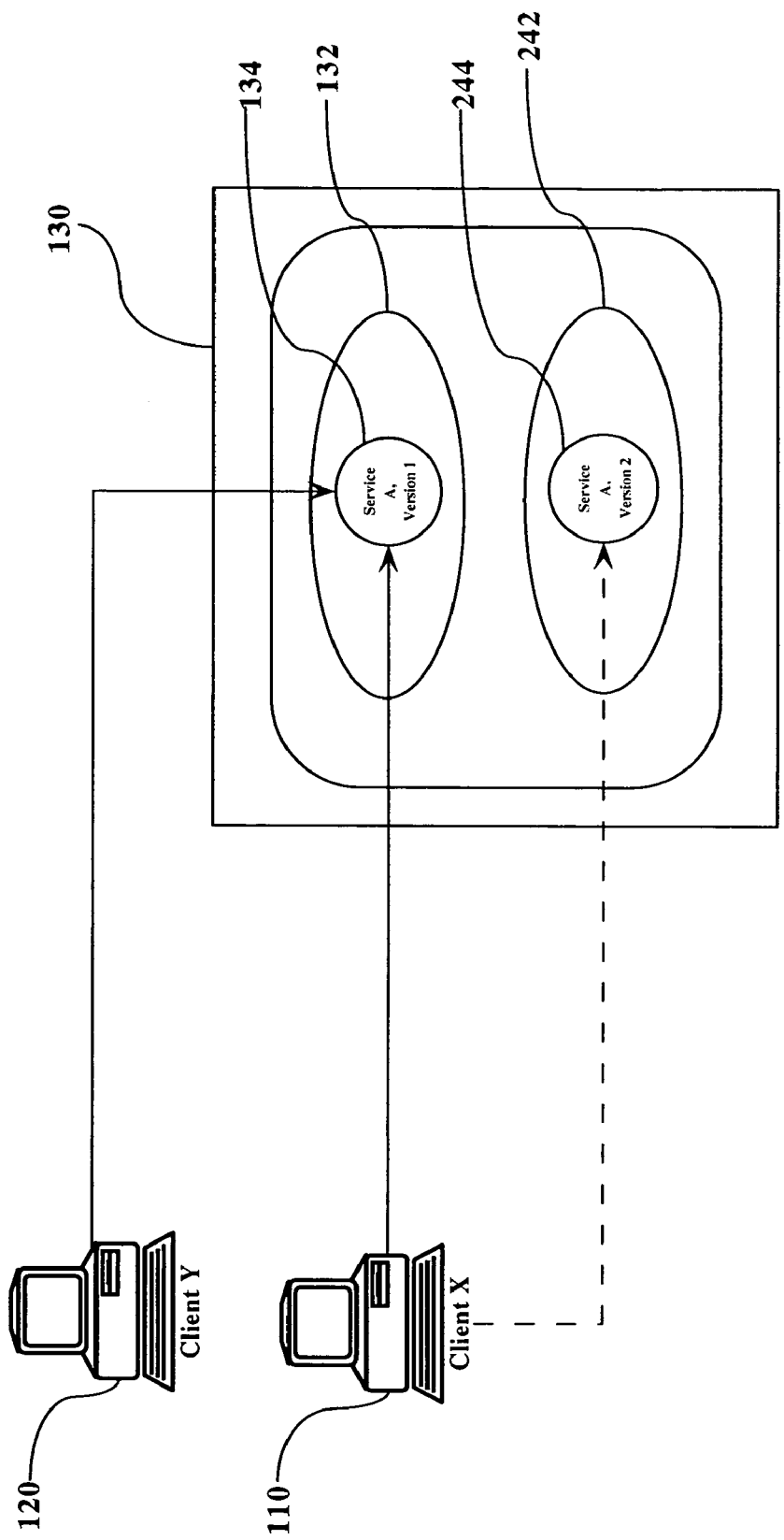
FIG. 2 illustrates the architecture and operation of a typical JNDI naming service being used to provide access to multiple versions of a particular service.

Referring now to FIG. 2, a situation is illustrated where there are two available versions of Service A, a first version called Service A, version 1 and a second version called Service A, version 2. Since both clients 110 and 120 are accessing the program using a single service name (e.g., Lotus Notes or Service A), both clients must access the same version, since prior art systems have no way of binding the same service name to different alias names. Thus, if EJB 134, which corresponds to version 1 of Service A, is identified by the service name "Lotus Notes", then when each client requests access to the service name Lotus Notes, they will be directed to EJB 134. If one of the clients, for example client 110, decides to switch to use the Service A, version 2, designated by EJB 244, then either both clients will have to access the same version (since EJB 244 will now have a pointer associated with the service name Lotus Notes so that anyone requesting Lotus Notes is directed to EJB 244), or clients 110 and 120 will have to be "version aware", meaning that distinct service names will have to be designated for each of EJB 134 and EJB 234 (e.g., Lotus Notes v.1 and Lotus Notes v.2) and then each client will have to be configured so that they access the different versions (client 110 will access Lotus Notes v.2 while client 120 will access Lotus Notes v.1). This alternate path is illustrated by the dotted line extending from client 110 to EJB 244.

As noted above, it is undesirable to require the clients to be version aware or to require that they all use the same version of a particular program or service.

Figure 3:
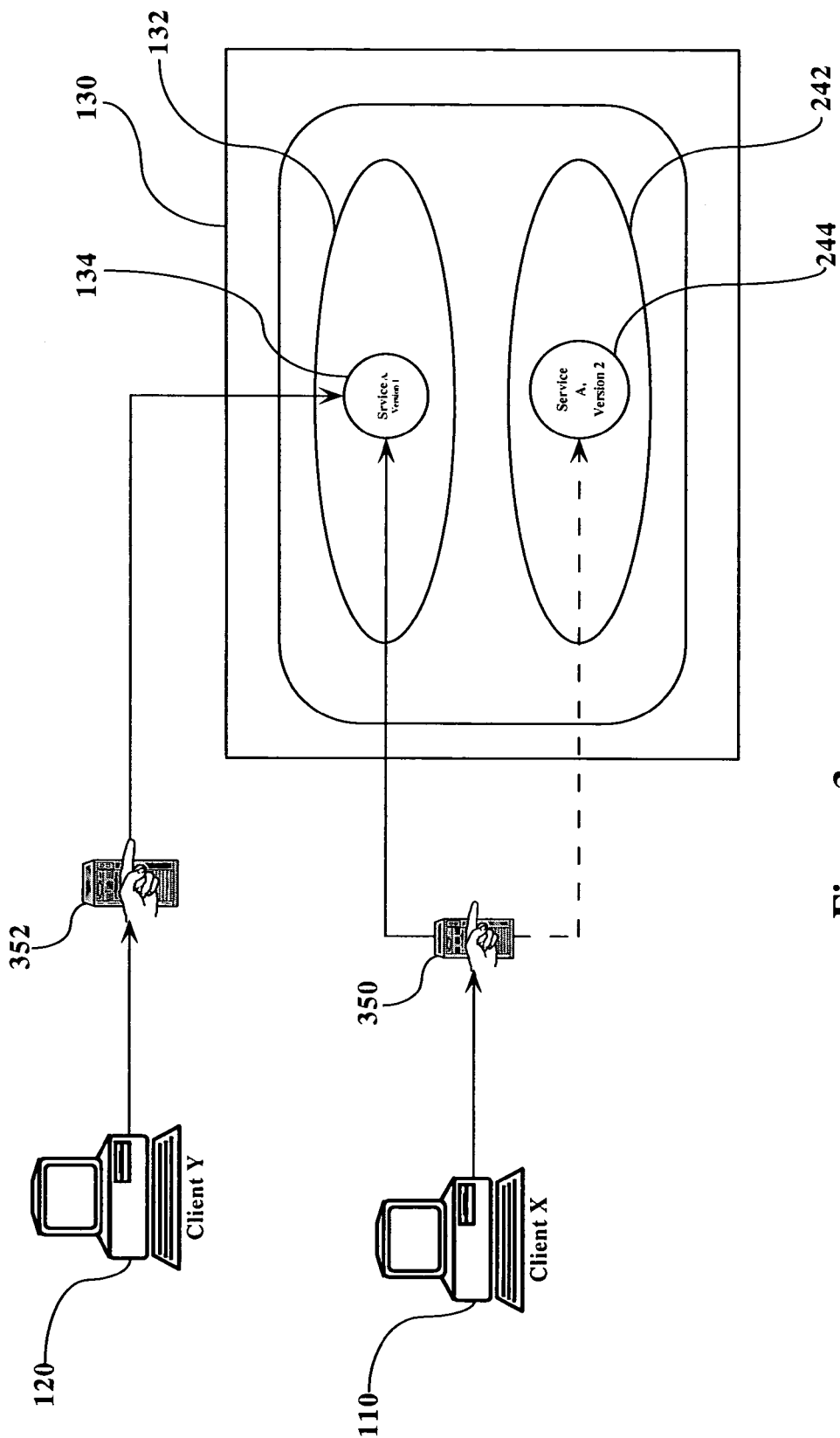
FIG. 3 illustrates a first embodiment of the present invention.

FIG. 3 illustrates a first embodiment of the present invention. Referring to FIG. 3, JNDI proxy servers 350 and 352 are interposed between each client and the application server 130.

In the case where only a single application version is available on the application server (e.g., if, in FIG. 3, there was only a single version of Service A, identified as EJB 134, more specifically Service A, version 1), then JNDI proxy 350 would bind the service name (a public name) used by client 110 to EJB 134, and JNDI proxy 352 would bind the service name used by client 120 to the same EJB 134. Presumably, the service name for each would be identical; however, with the binding process performed by the proxies, it is not necessary that they be the same.

In the case where there are multiple versions as shown in FIG. 3, if, for example, client 110 wishes to utilize the second version, Service A, version 2 illustrated by EJB 244, then proxy server 350 will bind the service name used by client 110 (which can be the same service name used by client 120 to access version 1) to EJB 244 instead of to EJB 134. In this manner, while on the surface each client may be "asking" for the same application/service (since they are using, for example, the same service name to make the request) the proxy servers will correctly serve the appropriate version to each client.

The application server "knows" which version each client wishes to access because this information is obtained from the client when the client makes a request for a service from the application server. On the client's end, there is a set up process that identifies the version of the software/program/service that the client will be accessing. In the client's set up process, each client has a configuration file that identifies which version of a particular application the client intends to use, and if this changes, the information is revised during a subsequent set up process using well-known techniques, for example, as part of the installation process for the new version. This information is stored in a configuration file for each client on the client's end. At start up, each proxy (located on the client's machine) reads the configuration file to determine which version the client intends to use, and when the client requests a service from the application server, binds the alias name of that version to the service name used by the client to access that program. Whenever the client changes the version it wishes to use, the proxy server associated with that client binds the newly desired version with the service name, so that the client will always get the right version, while other clients can access different versions using the same service name.

Figure 4:
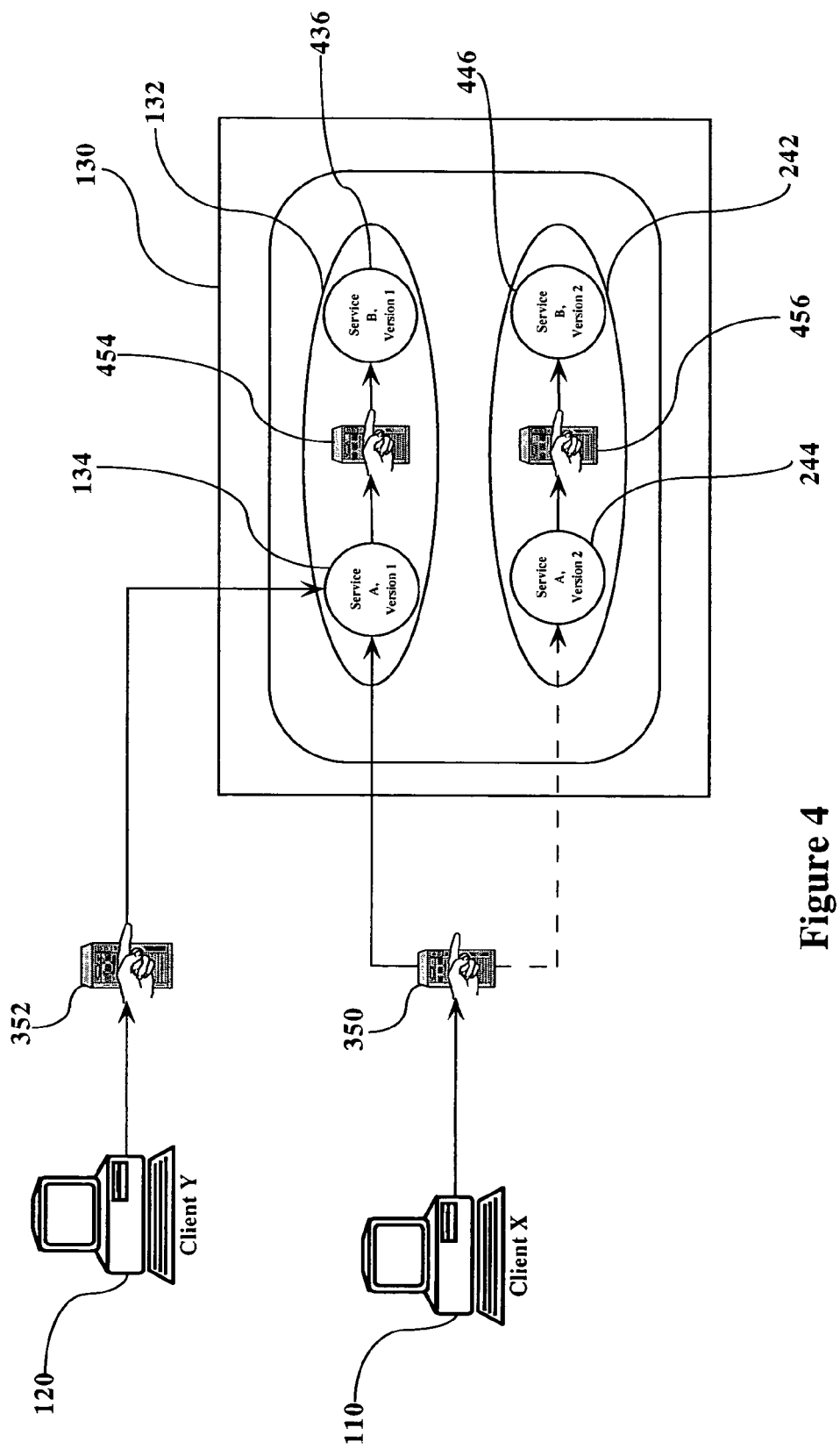
FIG. 4 illustrates the present invention utilized in a delegation-of-service environment.

In addition to remote clients, the JNDI proxy can also be used by internal application components to perform look up of other J2EE objects, e.g., to handle a delegation-of-services operation. For example, referring to FIG. 4, assume that EJB 134 specializes in handling requests such as data validation while EJB 446 specializes in information retrieval. An internal JNDI proxy 454 is situated between EJB 134 and EJB 446 such that EJB 446 is invoked upon request from EJB 134. This is an example of a delegation-of-services operation. Thus, if EJB 134 determines that a request does not possess all of the required validation information required to access UJB 446 (e.g., a required social security number has not been provided), then EJB 134 will not call the next service, the data retrieval service performed by EJB 446. Likewise, a second EJB 446 can be delegated by EJB 244 via proxy 456 in the same manner.

Figure 5:
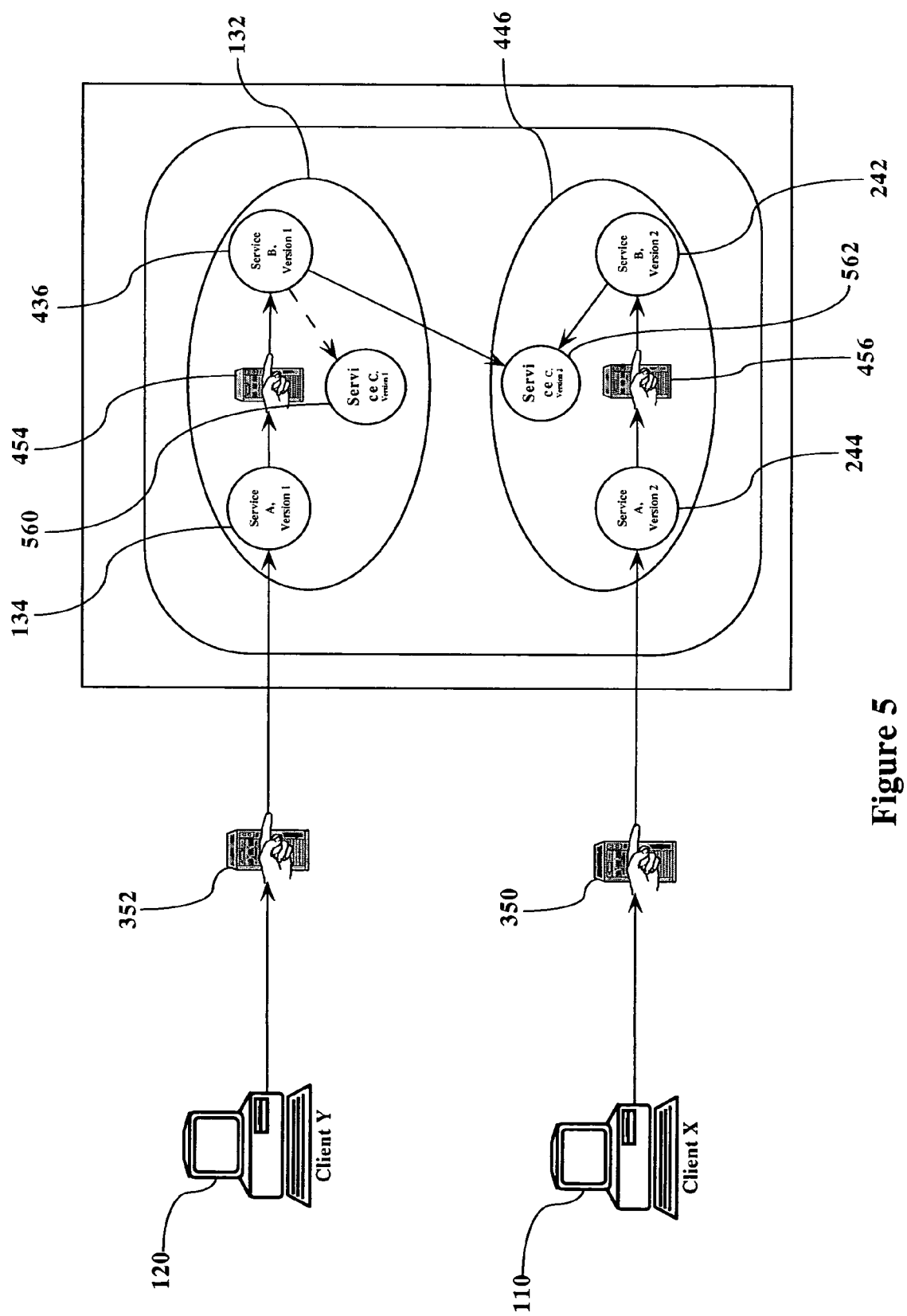
FIG. 5 illustrates the a delegation-of-service environment in which services are redirected across different versions of a service.

FIG. 5 illustrates the flexibility available using the system of the present invention. In this example, a second level of delegation is illustrated, whereby client 120 invokes Service A, version 1 represented by EJB 134 and EJB 134 in turn invokes Service B, version 1 represented by EJB 436. EJB 436 in turn can invoke Service C, version 1, represented by EJB 560 (this invocation is illustrated by the dotted line connection EJB 436 to EJB 560). However, FIG. 5 also illustrates that it is not necessary that the same version be maintained across all service invocations. As shown by the solid arrow from EJB 436 to EJB 562, Service B, version 1 (EJB 436) can be configured to invoke Service C, version 2 (EJB 562) instead of Service C, version 1 (EJB 560). This illustrates the flexibility of the JNDI proxy to be configured to direct services across different versions as desired.

Figure 6:
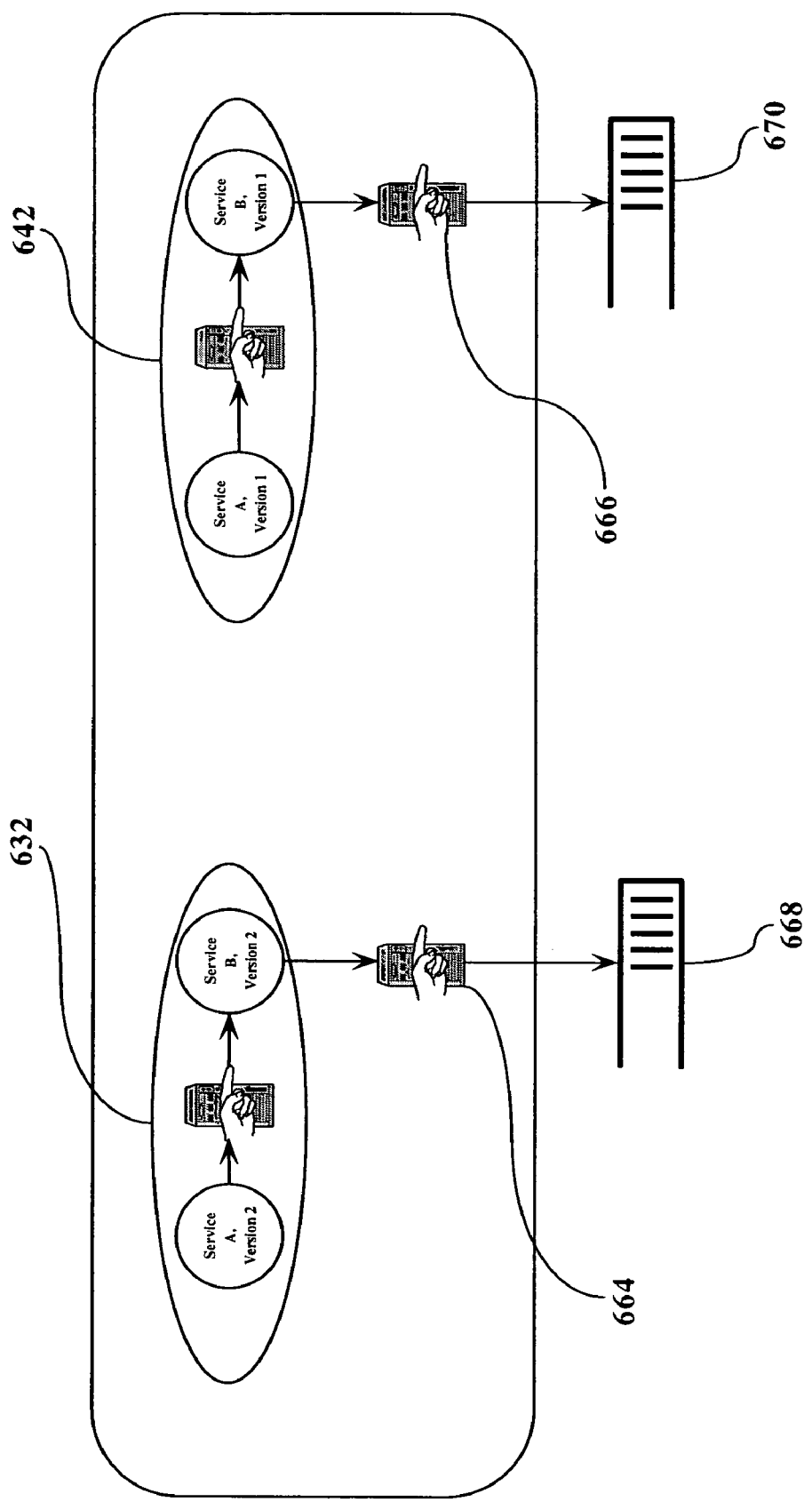
FIG. 6 illustrates the use of the present invention in connection with JMS queues.

Although described above with respect to providing version management for services provided through EJB resources, there are additional J2EE resources that can be affected by application versioning. For example, the JNDI proxy can be used for application versioning management of JMS resources. JMS resources include queues, queue connection factories, topics, and topic connection factories. Like other J2EE resources, each JMS resource can be bound by a name in the JNDI name service in the application server. These JMS resources can then be acquired and used by external clients or by internal EJBs. Thus, for example, as shown in FIG. 6, EJB 632 and EJB 642 are each separately connected, via JNDI proxies 664 and 666, respectively, to JMS queues 668 and 670, respectively. Each queue can be associated with the service name used by a particular client so that regardless of the service name used by the client, the information destined for or coming from the queue will always be linked to the correct client.

Figure 7:
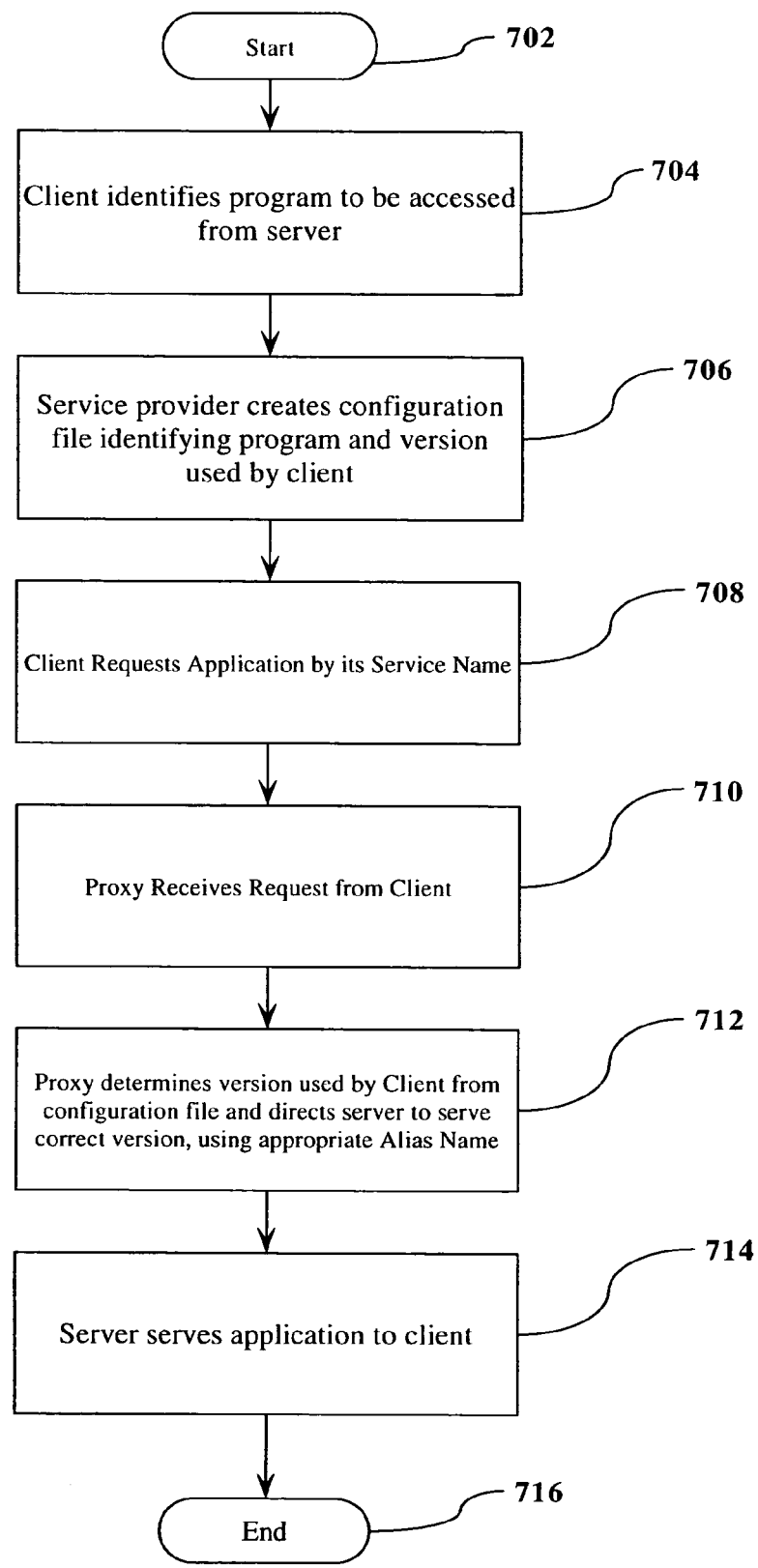
FIG. 7 is a flowchart illustrating an example of the basic steps performed in order to utilize the JNDI proxy server to enable multiple versioning in accordance with the present invention.

FIG. 7 is a flowchart illustrating an example of the basic steps performed in order to utilize the JNDI proxy server to enable multiple versioning in accordance with the present invention. Referring to FIG. 7, at step 702 the process begins, and at step 704, the client identifies the program/service to be accessed from the application server. Typically this would be performed during the installation of a particular software program on the client, for example, installation of software that will access the application server and retrieve a particular service or software solution from the server. At step 706, as part of this process, the service provider (the owner of the services provided on the application server) creates a configuration file identifying the program/service and version used by the particular client.

At step 708, the client requests the application using its service name. As discussed above, the service name can be the same for all clients accessing the application server, regardless of which version each client is using. At step 710, the proxy receives the request from the client, and at step 712, the proxy determines the version used by the client. The proxy does this by reading the configuration file. The proxy then directs the server to serve the correct version, using the appropriate alias name associated with the service name provided by the client.

At step 714, the server serves the appropriate version of the application to the client, and the process ends at step 716.

As is clear, the use of the JNDI proxies enables a great deal of flexibility in delivering and/or routing of programs, services, data, etc. between clients and their ultimate connection points. This invention can find application in application server architecture, email routing, bank transaction management, and any other environment where it is desired to have a client be free from the necessity of being version aware.

As described above, using the present invention, control of which version and/or release to deliver to a client from an application server is controlled by the proxy based on configuration information submitted by a particular client. Thus, the service name used to access the application/service does not need to be changed, but merely the binding of that name for a particular client to the particular version/release desired. This simplifies use of the client for the user, who typically does not care to have to specify between various versions, releases, etc.; they simply want to type in a familiar name and receive the application or service requested. This simplifies use of the system by the user, and also simplifies administration of releases and versions by system administrators.

Figure 8:
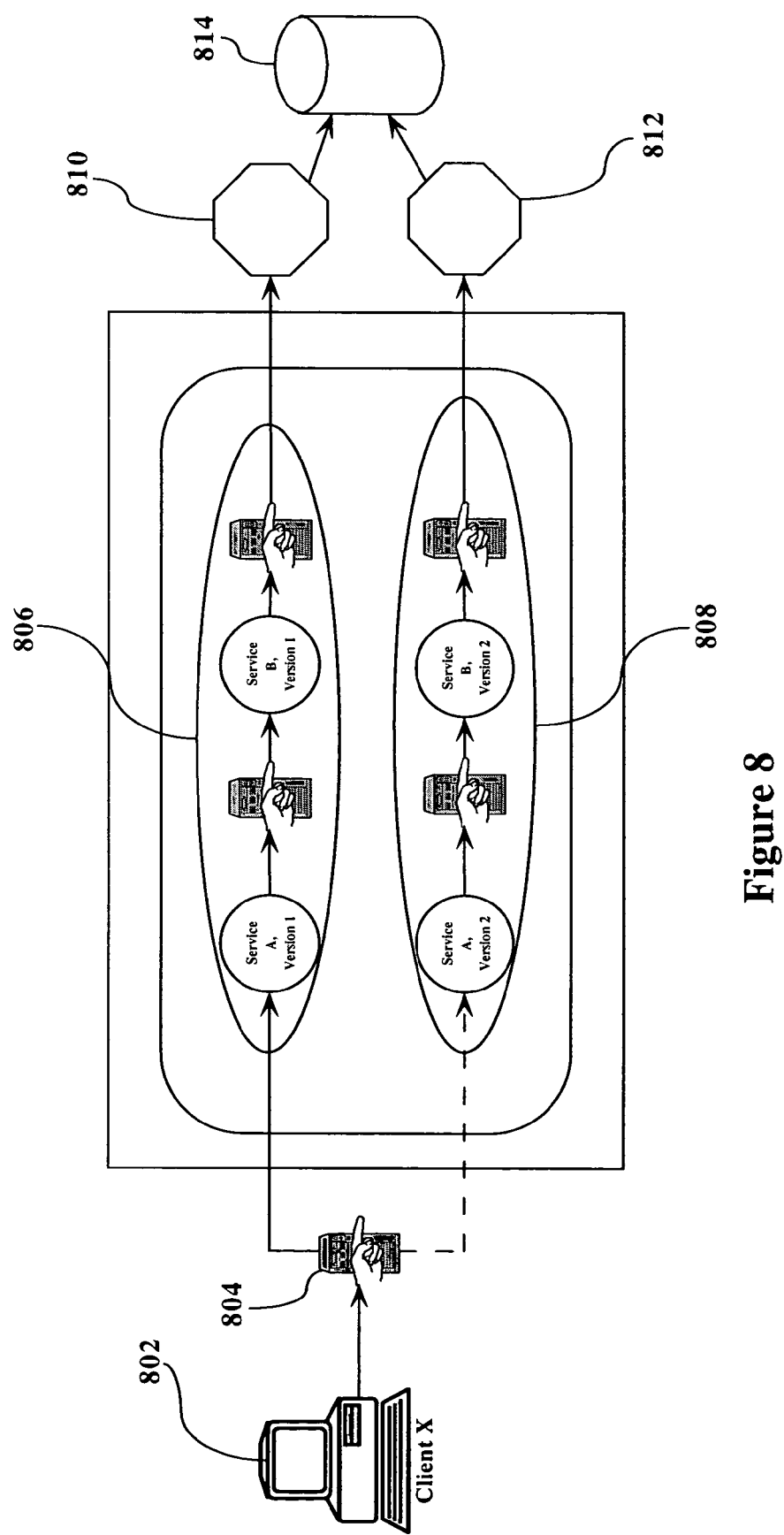
FIGS. 8 and 9 illustrate the use of the present invention in connection with a JDBC DataSource.
Figure 9:
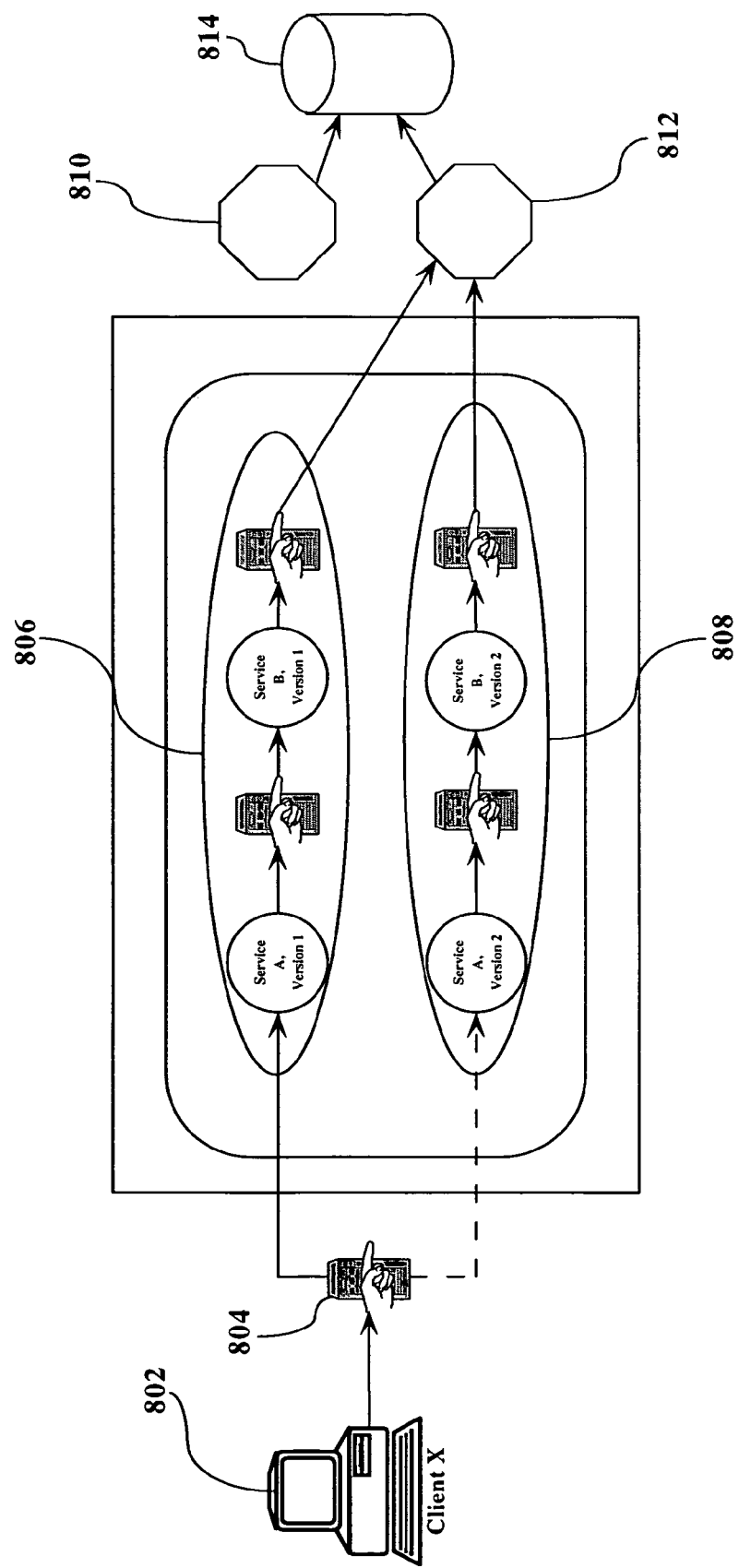

FIGS. 8 and 9 illustrate the use of the present invention in connection with a JDBC DataSource. A first example of such a datasource is illustrated in FIG. 8. In FIG. 8, a client 802 is coupled via a JNDI proxy 804 to EJBs 806 and 808 (each of which, in this example, illustrate delegation-of-services operations described above). Each of EJBs 806 and 808 are connected to JDBC DataSources; in this example EJB 806 is connected to JDBC DataSource 810, and EJB 808 is connected to JDBC DataSource 812. Each of the JDBC DataSources is in turn coupled to a database 814.

The JDBC DataSource is a named group containing ready-to-use JDBC connections. It establishes database connections when the connection pool starts up, and eliminates the overhead of establishing database connections on demand at run time. A DataSource object enables JDBC clients to obtain a database connection. Each DataSource object has a unique JNDI name and points to a JDBC connection pool. A client, which can be, for example, a Java application, an EJB, or an MDB, performs a JNDI look up for the DataSource to get a database connection.

To support datasources for multiple application versions, different DataSource versions can be configured for different application versions. With this option, datasources will be created for each application version. Each datasource will have a unique JNDI name, different from its peer in another application version. Application code that obtains database connections from datasources such as a Java client, an EJB, or an MDB, will use the similar approach of going through the JNDI proxy to perform a transparent JNDI name translation to access the appropriate datasource intended for that version. For example, in the illustration of FIG. 8, database 814 can represent a bank, and datasource 810 can represent a checking account with the bank, while datasource 812 can represent a savings account with the bank. This allows client 802 to direct checking deposits through datasource 810 and savings deposits through datasource 812, both of which will end up eventually at the bank 814.

FIG. 9 illustrates essentially the same architecture, but in this case, datasource 810, pertaining to the checking account, has been eliminated, and all data (e.g., electronic deposits) are directed through datasource 812, pertaining to the savings account. This would allow, for example, a user to decide to direct all deposits, etc. through the savings account if the bank decides to begin charging for use of the checking account. From the client perspective, the user will still designate deposits to go to checking and/or savings, but no apparent changes are made at the client end; all of the redirections are performed via the JNDI proxies as shown and described herein.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage associated with the client and/or application server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

The invention claimed is:

1. A method for managing an invocation of multiple versions of a J2EE program, stored on an application server, among multiple clients accessing the application server, using an identical service name for the invocation of the multiple versions of the J2EE program, comprising: interposing a JNDI proxy between each client and the application server; associating each client with one of said versions; and using said JNDI proxy, directing the version associated with a particular client to said particular client upon a request, comprising said identical service name, by said particular client for said J2EE program.

2. The method of claim 1, wherein associating each client with one of said versions comprises: assigning an identical service name used by each client to access said J2EE program; assigning an alias name for each version of said J2EE program; and for each client, associating said identical service name with the version of said J2EE program to be used by each of said clients.

3. The method of claim 2, wherein said J2EE program comprises one or more EJBs.

4. The method of claim 1, wherein said J2EE program comprises at least one JMS resource.

5. The method of claim 1, wherein said J2EE program comprises at least one JDBC datasource.

6. The method of claim 1, wherein said J2EE program is a system-oriented J2EE program.

7. A computer-implemented system, having a processor, for managing the invocation of multiple versions of a J2EE program, stored on an application server, among multiple clients accessing the application server, using an identical service name for the invocation of the multiple versions of the J2EE program, comprising: a JNDI proxy interposed between each client and the application server; means for associating each client with one of said versions using said processor; and means for directing, using said JNDI proxy and said processor, the version associated with a particular client to said particular client upon a request, comprising said identical service name, by said particular client for said J2EE program.

8. The system of claim 7, wherein said means for associating each client with one of said versions comprises: means for assigning an identical service name used by each client to access said J2EE program; means for assigning an alias name for each version of said J2EE program; and for each client, means for associating said identical service name with the version of said J2EE program to be used by each of said clients.

9. The system of claim 8, wherein said J2EE program comprises one or more EJBs.

10. The system of claim 7, wherein said J2EE program comprises at least one JMS resource.

11. The system of claim 7, wherein said J2EE program comprises at least one JDBC datasource.

12. The system of claim 7, wherein said J2EE program is a system-oriented J2EE program.

13. A computer program product for managing the invocation of multiple versions of a J2EE program, stored on an application server, among multiple clients accessing the application server, using an identical service name for the invocation of the multiple versions of the J2EE program, the computer program product comprising a non-transitory computer-readable storage medium having computer-readable program code embodied in the medium, the computer-readable program code comprising: computer-readable program code that interposes a JNDI proxy between each client and the application server; computer-readable program code that associates each client with one of said versions; and computer-readable program code that directs, using said JNDI proxy, the version associated with a particular client to said particular client upon a request, comprising said identical service name, by said particular client for said J2EE program.

14. The computer program product of claim 13, wherein said computer readable program code that associates each client with one of said versions comprises: computer-readable program code that assigns an identical service name used by each client to access said J2EE program; computer-readable program code that assigns an alias name for each version of said J2EE program; and computer-readable program code that for each client, associates said identical service name with the version of said J2EE program to be used by each of said clients.

15. The computer program product of claim 14, wherein said J2EE program comprises one or more EJBs.

16. The computer program product of claim 13, wherein said J2EE program comprises at least one JMS resource.

17. The computer program product of claim 13, wherein said J2EE program comprises at least one JDBC datasource.

18. The computer program product of claim 13, wherein said J2EE program is a system-oriented J2EE program.

* * * * *